April 3, 1956     G. F. SCHAEFER     2,740,640
WHEEL SUSPENSION OF THE LEVER AND COIL TYPE
Filed Dec. 1, 1953     2 Sheets-Sheet 1
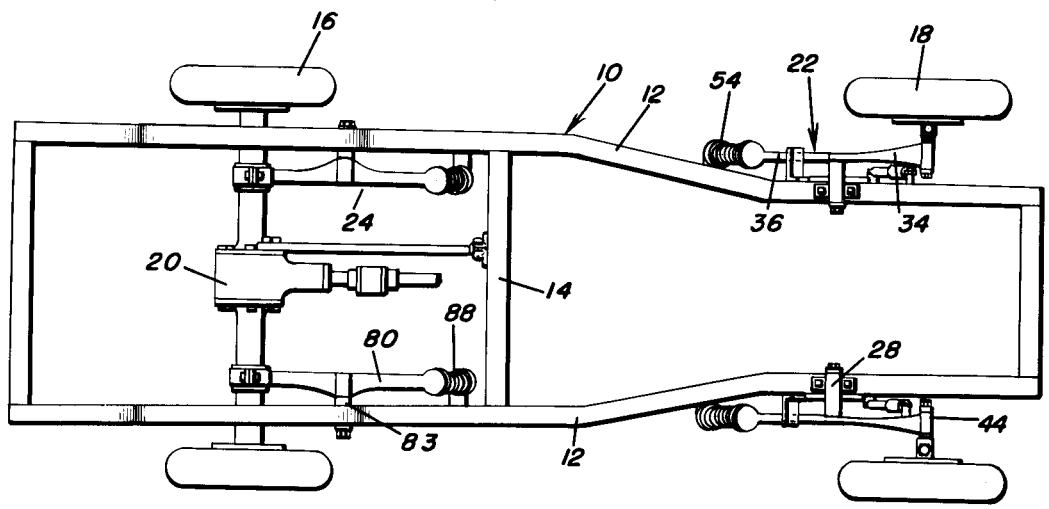
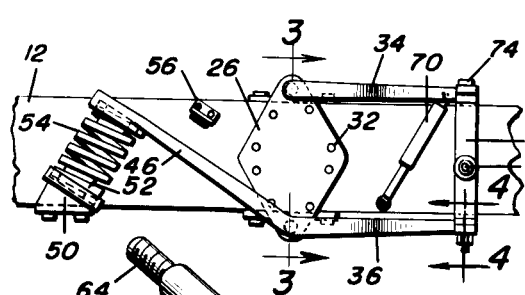
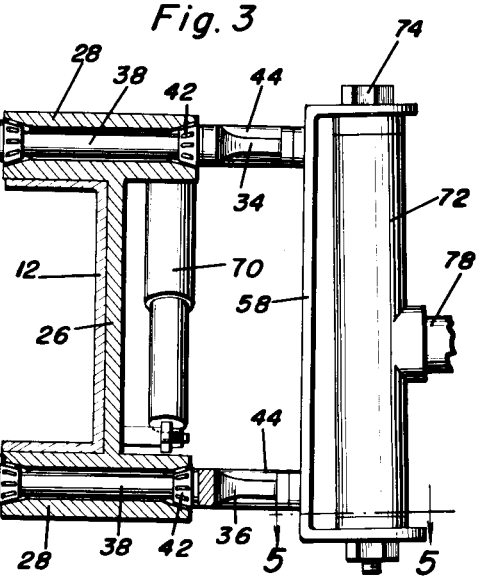
George F. Schaefer
INVENTOR.

April 3, 1956  G. F. SCHAEFER  2,740,640
WHEEL SUSPENSION OF THE LEVER AND COIL TYPE
Filed Dec. 1, 1953  2 Sheets-Sheet 2
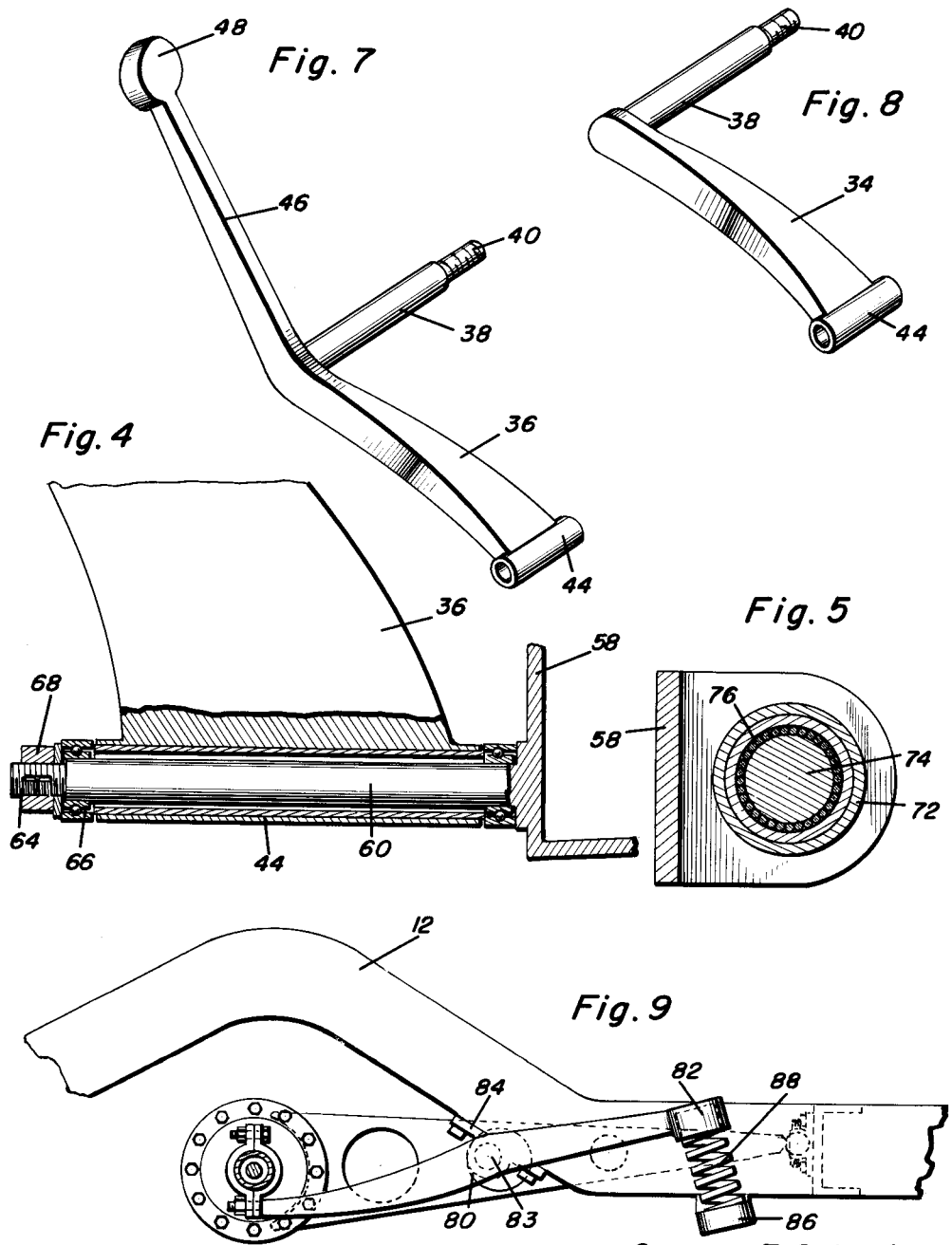
George F. Schaefer
INVENTOR.

United States Patent Office 2,740,640
Patented Apr. 3, 1956

2,740,640

WHEEL SUSPENSION OF THE LEVER AND COIL TYPE

George F. Schaefer, Hawthorne, Calif.

Application December 1, 1953, Serial No. 395,457

1 Claim. (Cl. 280—124)

This invention relates to a wheel suspension and more specifically provides a spring supporting mechanism for vehicle wheels.

The primary object of this invention is to provide a wheel suspension including a spring assembly for each vehicle wheel and wherein the force of the spring is opposed to the effective action of the wheel.

Another object of this invention is to provide a wheel suspension including a shock absorbing means for dampening the movement of the wheel.

A further object of this invention is to provide a wheel suspension for movably mounting a vehicle wheel on a vehicle frame wherein the wheel is limited in movement to a single vertical plane.

Yet another object of this invention is to provide a wheel suspension having a pivotal parallelogram linkage system for permitting vertical swinging movement of a vehicle wheel.

A still further important object of this invention is to provide a wheel suspension which is highly stable, free in movement, permits low frame construction in modern automobiles or vehicles and inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of a vehicle frame and wheel showing the suspension system of this invention;

Figure 2 is a detailed side elevational view of one of the front wheel suspensions;

Figure 3 is a transverse, vertical section taken substantially along section line 3—3 of Figure 2 showing the details of the wheel suspension mounting element;

Figure 4 is a detailed vertical section taken substantially along section line 4—4 of Figure 2 showing the wheel supporting member of the front wheel suspension;

Figure 5 is a detailed top plan section taken substantially along section line 5—5 of Figure 3 showing the details of construction of the wheel support;

Figure 6 is a detailed perspective view showing the wheel supporting member and the extending rods thereon;

Figure 7 is a perspective view of the lower lever in the front wheel suspension;

Figure 8 is a perspective view of the upper lever and the front wheel suspension; and Figure 9 is a detailed side elevational view showing one of the rear suspension devices.

Referring now specifically to the drawings it will be seen that the numeral 10 generally designates a vehicle frame having elongated side rails 12 and a plurality of transverse members 14 forming a conventional vehicle frame 10. The frame 10 is supported in spaced relation to a supporting surface by rear wheels 16 and front wheels 18. The rear wheels 16 include the usual running gear indicated by the numeral 20 for propelling the vehicle frame 10 over a supporting surface. As shown specifically in Figure 1, the front wheels 18 are suspended as generally indicated by the numeral 22 and the rear wheels 16 are suspended from the frame 10 by a suitable suspension means 24.

Inasmuch as each of the front wheel suspensions 22 are identical, a detailed explanation of one of the suspension means 22 will be sufficient. A plate 26 is secured to the side rail 12 adjacent the front end thereof and spaced rearwardly from the front wheels 18. Each end of the plate 26 is provided with an elongated tubular socket 28 having countersunk end portion 30 for a purpose described hereinafter. As shown in Figure 3, the side rail 12 is generally a channel-shaped member with the legs of a channel facing inwardly and the plate 26 is secured to the web of the side rail 12 by suitable fastening means 32. An upper lever 34 and a lower lever 36 includes a laterally extending rod 38 having a reduced screw threaded end portion 40 for reception in the tubular socket 28. A tapered roller bearing 42 is provided at each end of the rod 38 and disposed between the rod 38 and the socket 28 for rotatably journalling the rod 38 in the socket 28. An internally screw threaded nut 43 is positioned on the threaded portion 40 in conjunction with suitable washers and cotter pins for retaining the levers 34 and 36 in assembled relation. As shown in Figures 7 and 8, one end of each of the levers 34 and 36 is provided with an elongated tubular sleeve 44 which is disposed in parallel relation to the extending rod 38.

As shown in Figures 2 and 7, the lower lever 36 is provided with a rearwardly and upwardly extending portion 46 having a spring seat 48 on the extreme end thereof. A spring supporting bracket 50 is positioned on the frame rail 12 in spaced relation to the seat 48. The seat 48 and the bracket 50 include a cylindrical projecting portion 52 for guiding and positioning a compression coil spring 54 between the bracket 50 and the spring seat 48 thereby resisting downward movement of the spring seat 48 and upward movement of the keeper sleeve 44. A right angular bracket 56 is provided adjacent the upper edge of the side rail 12 in spaced relation to the upwardly extending portion 46 of the lever 36 for limiting the upward pivotal movement of the upwardly extending portion 46.

As shown specifically in Figure 6, a U-shaped wheel supporting member 58 has a pair of projecting rods 60 on the bight portion thereof and apertures 62 on the leg portions thereof. The leg portions of the U-shaped member 58 extend in opposite directions from the laterally extending member 60. The laterally extending rods 60 include reduced and threaded end portions 64. The laterally extending rods 60 are rotatably journalled in the tubular sleeve 44 and ball bearings 66 are disposed around the rods 60 and disposed between the rods 60 and the sleeve 44 thereby journalling the rods 60 for pivotal movement. A suitable nut 68 is positioned on the threaded portion 64 for retaining the wheel support 58 between the levers 34 and 36. It will be understood that the wheel support member 58 forms a link which in conjunction with the levers 34 and 36 and the plate 26 forms a pivotal parallelogram linkage.

As shown in Figure 2, a shock absorber 70 is disposed between the lower edge of the frame rail 12 and the upper and outer end of the upper lever 34 thereby dampening movement of the levers 34 and 36 about the pivot axis formed by the rod 38. A tubular member 72 is positioned between the legs of the U-shaped wheel support 58 and a bolt or retaining pin 74 is inserted through the apertures 62 and the tubular member 72. Suitable needle bearings 76 are disposed between the tubular member 72 and the retaining pin 74 thereby rotatably journalling the tubular member 72 on the U-shaped wheel support 58. A wheel spindle or axle 78 is positioned centrally of the tubular member 72 and the front wheel 18 is positioned thereon in a conventional manner. It will be understood that suitable linkage may be attached to the tubular member 72 for turning the wheel 18.

As shown in Figure 9, the rear suspension 24 includes a single pivotal lever 80 having a spring seat 82 at one end thereof and being pivotally attached to the axle housing at the other end thereof. Adjacent the center of the lever 80 a projecting rod 83 is provided for pivotal motion in a tubular socket 84. A suitable bracket 86 is provided with a spring seat and a coil spring 88 is positioned between the seat 82 and the bracket 86 thereby limiting the upward movement of the running gear and the wheels 16 in relation to the usual frame 10. The action of the pivot lever 80 appears to be obvious and no further explanation will be necessary.

It will be seen from the foregoing construction that the device of this invention will permit swinging movement of the vehicle wheels 16 and 18 in a vertical plane wherein the swinging movement is resisted in one direction by the spring member and is dampened by the shock absorber means. The pivot parallelogram linkage as employed in the front wheel suspension 22 permits a low frame construction employed in modern-day automobiles and it also permits the movement of the front wheel 18 in a single vertical plane thereby eliminating the loss of control caused by the front wheels of the vehicle leaning or tilting when going around a curve. It further will be seen that this device will accurately maintain the front wheels 18 in alignment thereby eliminating the necessity of frequent alignment and adjustment.

What is claimed as new is as follows:

A wheel suspension for vehicles comprising a frame member, a vertical mounting plate secured to the outer side surface of said frame member, a horizontally disposed tubular socket at the upper and lower end of said plate, said sockets extending over the upper and lower edges of said frame member, a pair of levers, a laterally projecting rod on each of said levers pivotally positioned in said sockets, said levers extending substantially parallel to the frame member, an elongated tubular sleeve on the forward end of each lever, a vertically disposed connecting link pivotally attached to the forward end of said levers and supporting a wheel spindle, a pair of projecting rods on said link pivotally positioned in said sleeves, a shock absorber extending from said frame to a point adjacent the forward end of the upper lever, the lower of said levers extending rearwardly beyond said mounting plate and terminating in a coil spring seat, a coil spring disposed between the spring seat and a bracket on the frame member for resiliently resisting pivotal movement of said lower lever in one direction thereby resisting movement of said wheel spindle in one direction.

References Cited in the file of this patent

UNITED STATES PATENTS

| | | |
|---|---|---|
| 2,052,309 | Kovach | Aug. 25, 1936 |
| 2,139,592 | Kirby | Dec. 6, 1938 |
| 2,233,145 | Schimek | Feb. 25, 1941 |
| 2,559,239 | Watson | July 3, 1951 |